United States Patent
Feng

(10) Patent No.: US 9,488,991 B2
(45) Date of Patent: Nov. 8, 2016

(54) FAN CONTROL SYSTEM FOR SHIPPING CONTAINER

(71) Applicant: ShenZhen Treasure City Technology Co., LTD., Shenzhen (CN)

(72) Inventor: Wen-Kao Feng, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 644 days.

(21) Appl. No.: 14/021,860

(22) Filed: Sep. 9, 2013

(65) Prior Publication Data

US 2014/0188284 A1  Jul. 3, 2014

(30) Foreign Application Priority Data

Dec. 29, 2012 (CN) .......................... 2012 1 0589147

(51) Int. Cl.
*G05D 23/19* (2006.01)

(52) U.S. Cl.
CPC ..................... *G05D 23/19* (2013.01)

(58) Field of Classification Search
CPC .......... G05D 23/19; H02P 1/24; H02P 7/288
USPC ................. 700/275; 388/804, 811, 819, 934; 318/471, 599, 811
See application file for complete search history.

(56) References Cited

U.S. PATENT DOCUMENTS

| | | | | |
|---|---|---|---|---|
| 8,280,559 B2* | 10/2012 | Herman | ................ | G05D 23/19 165/247 |
| 2005/0066672 A1* | 3/2005 | Yamamoto | ......... | H05K 7/20209 62/186 |
| 2006/0181232 A1* | 8/2006 | Oljaca | .................... | G06F 1/206 318/268 |
| 2007/0114963 A1* | 5/2007 | Steiner | ..................... | H02P 1/24 318/772 |
| 2008/0075440 A1* | 3/2008 | Lin | ........................... | H02P 6/08 388/820 |
| 2008/0309165 A1* | 12/2008 | Hoshiba | .................... | F01P 7/08 307/41 |
| 2010/0066172 A1* | 3/2010 | Lv | ......................... | G05D 23/19 307/64 |
| 2011/0070098 A1* | 3/2011 | Horng | ................... | F04D 25/166 417/18 |

\* cited by examiner

*Primary Examiner* — Sean Shechtman
*Assistant Examiner* — Jason Lin
(74) *Attorney, Agent, or Firm* — Zhigang Ma

(57) ABSTRACT

A fan control system includes an AC power supply, a fan module, a switch control module, a switch unit, and a control module. The control module includes a number of outputs. The switch unit includes a number of switches. The switch control module includes a number of relays. The control module outputs a high voltage or a low voltage to control the number of relays via the number of switches to change a rotating speed of the fan module.

11 Claims, 2 Drawing Sheets

FAN CONTROL SYSTEM FOR SHIPPING CONTAINER

BACKGROUND

1. Technical Field

The present disclosure relates to control systems, and more particularly to a fan control system for a shipping container.

2. Description of Related Art

When a shipping container needs to maintain a predetermined temperature, a fan is needed to maintain the temperature. However, the fan needs to be controlled to account for temperature fluctuations within the shipping container. Therefore, a fan control system is needed to control a rotating speed of the fan.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
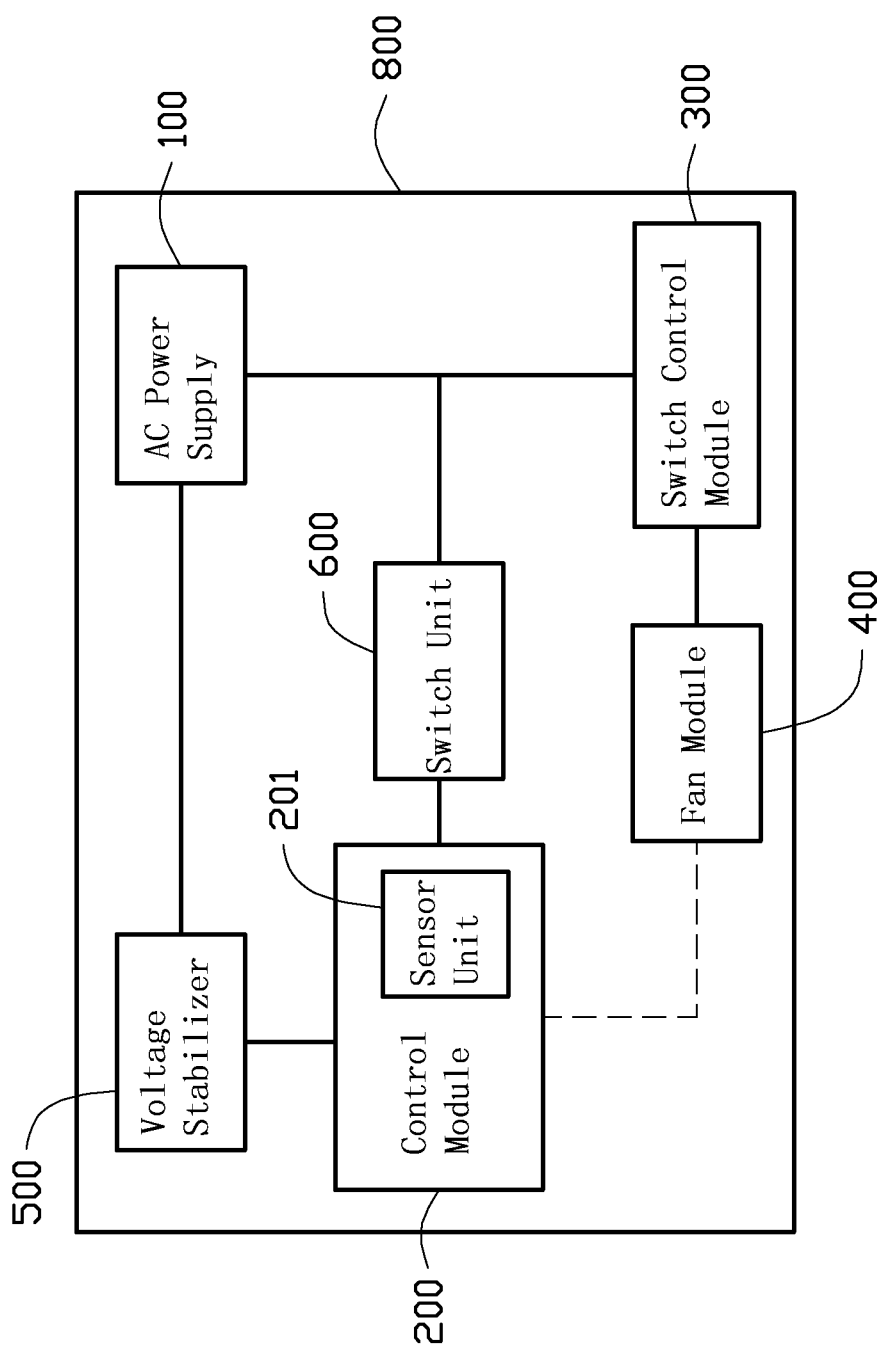
FIG. 1 is a block view showing components and a connection relationship of a fan control module, in accordance with an embodiment.
Figure 2:
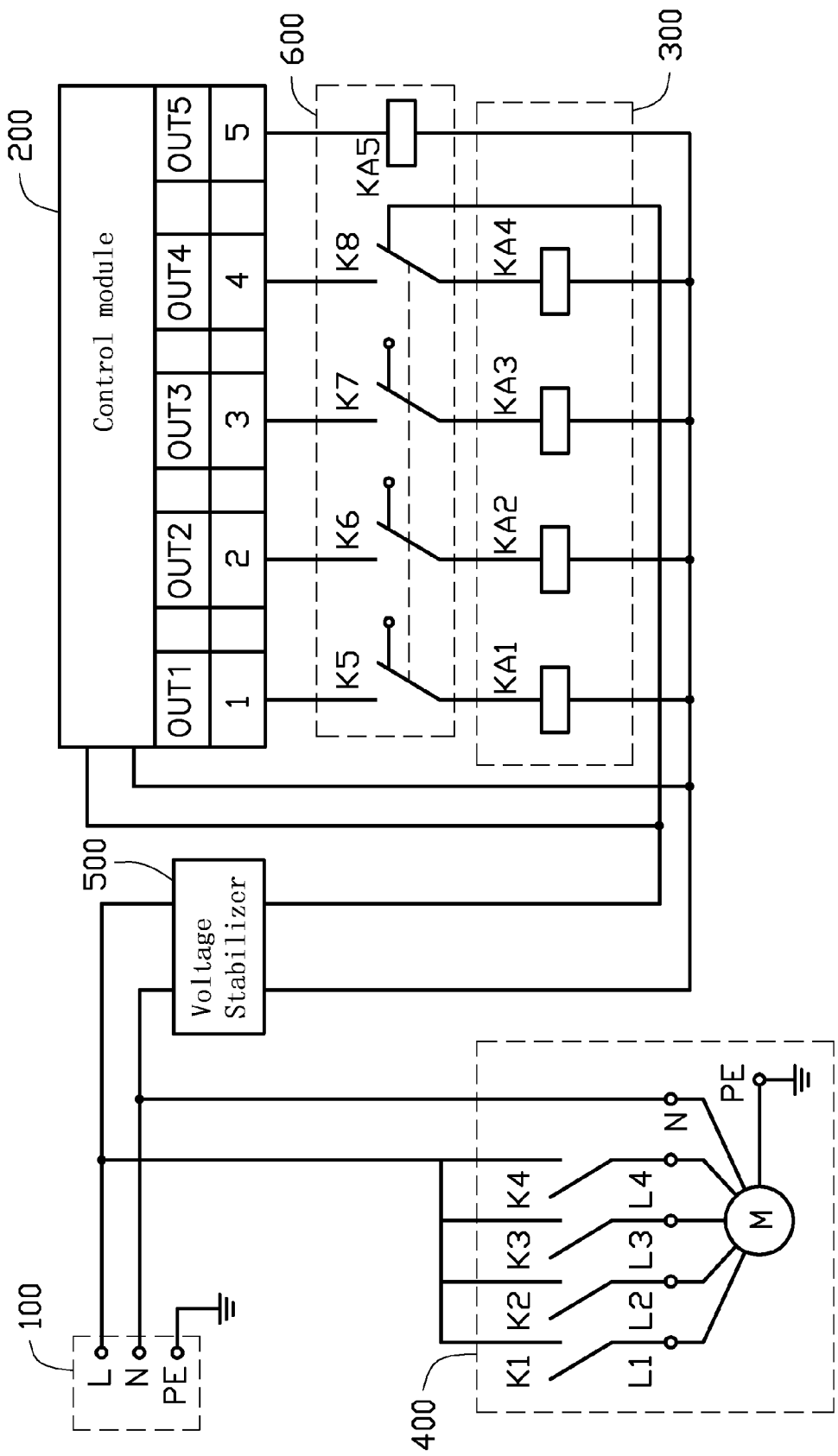
FIG. 2 is a circuit diagram of the fan control module of FIG. 1.

FIGS. 1-2 illustrate an embodiment of a fan control system configured for adjusting a temperature in a shipping container 800. The shipping container has a plurality of server racks installed. The fan control system comprises an alternating current (AC) power supply 100, a control module 200, a switch control module 300, a fan module 400, a voltage stabilizer 500, and a switch unit 600.

The AC power supply 100 comprises a live wire output L, a neutral wire output N, and a ground wire output PE. The ground wire output PE is grounded.

The fan module 400 comprises a fan M and first to fourth switches K1-K4. The fan M comprises four live wire inputs L1-L4, a neutral wire input N, and a ground wire input PE. The four live wire inputs L1-L4 are coupled to the live wire output L via the first to fourth switches K1-K4. The neutral wire input N is coupled to the neutral wire output N of the AC power supply 100. The ground wire PE input is grounded. The first to fourth switches K1-K4 control the fan M to rotate at four different speeds, respectively. For example, when the first switch K1 is switched on, the fan M is rotated at a first speed, and when the second switch K2 is switched on, the fan M is rotated at a second speed. The fan rotation speed increases from the first to the fourth rotation speed.

The control module 200 is coupled to the live wire output L and the neutral wire output N of the AC power supply 100 via the voltage stabilizer 500. The voltage stabilizer 500 automatically maintains a constant voltage level. The control module 200 comprises a first output OUT1, a second output OUT2, a third output OUT3, a fourth output OUT4, and a fifth output OUT5.

The switch control module 300 is coupled between the switch unit 600 and the voltage stabilizer 500, and comprises first to fourth relays KA1-KA4. The first to fourth relays KA1-KA4 control the first to fourth switches K1-K4 to switch on or off. A first end of each of the first to fourth relays KA1-KA4 is coupled to the neutral wire output N of the AC power supply 100 via the voltage stabilizer 500.

The switch unit 600 is coupled between the control module 200 and the switch control module 300. The switch unit 600 comprises fifth to eighth switches K5-K8 and a fifth relay KA5. The fifth switch K5 is coupled between the first output OUT1 and a second end of the first relay KA1. The sixth switch K6 is coupled between a second end of the second relay KA2 and the second output OUT2. The seventh switch K7 is coupled between a second end of the third relay KA3 and the third output OUT3. The eighth switch K8 is coupled between a second end of the fourth relay KA4 and the fourth output OUT4. In addition, the fourth output OUT4 is coupled to the live wire output L of the AC power supply 100 via the eighth switch K8 and the voltage stabilizer 500. The fifth output OUT5 is coupled to the neutral wire output N of the AC power supply 100 via the fifth relay KA5 and the voltage stabilizer 500.

When the control module 200 operates, a high voltage is output from the fifth output OUT5 to the fifth relay KA5 of the switch unit 600, and the fifth to eighth switches K5-K8 are switched on by the fifth relay KA5. When the first output OUT1 of the control module 200 outputs a high voltage to the first relay KA1 via the fifth switch K5, the first switch K1 is switched on by the first relay KA1; when the first output OUT1 outputs a low voltage to the first relay KA1 via the fifth switch K5, the first switch K1 is switched off by the first relay KA1. The second to fourth switches K2-K4 are similarly switched on and off by the corresponding second to fourth relays KA2-KA4 when the corresponding outputs OUT2-OUT4 send a high or low voltage to the corresponding second to fourth relays KA2-KA4 via the corresponding sixth to eighth switches K6-K8.

When the control module 200 is not operating, the fifth output OUT5 does not send a high voltage to the fifth relay KA5, and the fifth to eighth switches K5-K8 are switched off. The live wire output L of the AC power supply 100 sends a high voltage to the fourth relay KA4 via the voltage stabilizer 500, and the fourth switch K4 is switched on by the fourth relay KA4. Therefore, the fan M is rotated at the fourth rotation speed.

The control module 200 is configured to set a predetermined temperature. The control module 200 further comprises a sensor unit 201 to detect a temperature where the fan M is located. When the temperature detected by the sensor unit 201 is less than or greater than the predetermined temperature, the control module 200 determines whether to send a high voltage or a low voltage to the fifth to eighth switches K5-K8.

In another embodiment, the control module 200 is configured to set a predetermined air pressure in the container 800, and the sensor unit 201 detects an air pressure where the fan M is located. The air pressure is changed by changing the temperature as previously described.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A fan control system comprising:
an alternating current (AC) power supply comprising a live wire output and a neutral wire output;
a fan module comprising a fan and a fourth switch, the fan is coupled to the live wire output of the AC power supply via the fourth switch and coupled to the neutral wire output;
a switch control module comprising a fourth relay;
a switch unit comprising an eighth switch and a fifth relay; and
a control module coupled to the live wire output and the neutral wire output, the control module comprising a fourth output and a fifth output, the fourth output coupled to the fourth relay via the eighth switch, and the fifth output coupled to the neutral wire output via the fifth relay;
wherein when the fifth output of the control module outputs high voltage to the fifth relay, the eighth switch is switched on by the fifth relay, and the control module is capable of sending high or low voltage to the fourth relay to switch the fourth switch on or off to change rotation speeds of the fan module; and when the fifth output of the control module cannot output the high voltage to the fifth relay, the eighth switch is switched off by the fifth relay, and the fourth relay is coupled to the live wire output and the neutral wire output via the eighth switch and switches the fourth switch on to have the fan module rotating.

2. The fan control system of claim 1, wherein a first switch is coupled to the fan module and the live wire output of the AC power supply; when the first switch is switched on, the fan module is rotated in a first rotation speed; when the fourth switch is switched on, the fan module is rotated in a fourth rotation speed; and the fourth rotation speed is greater than the first rotation speed.

3. The fan control system of claim 2, wherein the switch control module further comprises a first relay; the switch unit further comprises a fifth switch; the control module further comprises a first output; the first output of the control module is coupled to the neutral wire output of the AC power supply via the fifth switch and the first relay; when the fifth output of the control module outputs high voltage to the fifth relay, the fifth switch is switched on by the fifth relay, and the control module is capable of sending high or low voltage to the first relay to switch the first switch on or off to change rotation speeds of the fan module; and when the fifth output of the control module cannot output the high voltage to the fifth relay, the first switch is switched off.

4. The fan control system of claim 1, wherein a second switch is coupled to the fan module and the live wire output of the AC power supply; when the second switch is switched on, the fan module is rotated in a second rotation speed; when the fourth switch is switched on, the fan module is rotated in a fourth rotation speed; and the fourth rotation speed is greater than the second rotation speed.

5. The fan control system of claim 4, wherein the switch control module further comprises a second relay; the switch unit further comprises a sixth switch; the control module further comprises a second output; the second output of the control module is coupled to the neutral wire output of the AC power supply via the sixth switch and the second relay; when the fifth output of the control module outputs high voltage to the fifth relay, the sixth switch is switched on by the fifth relay, and the control module is capable of sending high or low voltage to the second relay to switch the second switch on or off to change rotation speeds of the fan module; and when the fifth output of the control module cannot output the high voltage to the fifth relay, the second switch is switched off.

6. The fan control system of claim 1, wherein a third switch is coupled to the fan module and the live wire output of the AC power supply; when the third switch is switched on, the fan module is rotated in a third rotation speed; when the fourth switch is switched on, the fan module is rotated in a fourth rotation speed; and the fourth rotation speed is greater than the third rotation speed.

7. The fan control system of claim 6, wherein the switch control module further comprises a third relay; the switch unit further comprises a seventh switch; the control module further comprises a third output; the third output of the control module is coupled to the neutral wire output of the AC power supply via the seventh switch and the third relay; when the fifth output of the control module outputs high voltage to the fifth relay, the seventh switch is switched on by the fifth relay, and the control module is capable of sending high or low voltage to the third relay to switch the third switch on or off to change rotation speeds of the fan module; and when the fifth output of the control module cannot output the high voltage to the fifth relay, the third switch is switched off.

8. The fan control system of claim 1, wherein the control module sets a predetermined temperature and further comprises a sensor unit; the sensor unit is capable of detecting a temperature of which the fan module is located in; the control module sends high or low voltage to the fourth relay according to a comparison between the temperature detected by the sensor unit and the predetermined temperature.

9. The fan control system of claim 1, wherein the control module sets a predetermined air pressure and further comprises a sensor unit; the sensor unit is capable of detecting an air pressure of which the fan module is located in; the control module sends high or low voltage to the fourth relay according to a comparison between the air pressure detected by sensor unit and the predetermined air pressure.

10. The fan control system of claim 1, wherein the control module is coupled to the live wire output and the neutral wire output of the AC power supply via a voltage stabilizer.

11. The fan control system of claim 10, wherein the fourth relay and the fifth relay is coupled to the neutral wire output of the AC power supply via the voltage stabilizer.

* * * * *